(12) United States Patent
Urata et al.

(10) Patent No.: US 7,444,063 B2
(45) Date of Patent: Oct. 28, 2008

(54) INFORMATION-RECORDING APPARATUS, INFORMATION-RECORDING METHOD, INFORMATION-REPRODUCING APPARATUS, INFORMATION-REPRODUCING METHOD, AND INFORMATION-RECORDING MEDIUM

(75) Inventors: Kaoru Urata, Kanagawa (JP); Mikio Kita, Kanagawa (JP)

(73) Assignee: Sony Corporation (JP)

( * ) Notice: Subject to any disclaimer, the term of this patent is extended or adjusted under 35 U.S.C. 154(b) by 843 days.

(21) Appl. No.: 10/813,120

(22) Filed: Mar. 31, 2004

(65) Prior Publication Data

US 2004/0197086 A1 Oct. 7, 2004

(30) Foreign Application Priority Data

Apr. 4, 2003 (JP) .......................... P2003-101302

(51) Int. Cl.
*H04N 5/91* (2006.01)
(52) U.S. Cl. .................. 386/79; 386/88; 386/96
(58) Field of Classification Search .............. 386/46, 386/95, 96, 69, 79, 80, 54, 57
See application file for complete search history.

(56) References Cited

U.S. PATENT DOCUMENTS 5,960,149 A * 9/1999 Kim ............................ 386/54

6,636,266 B2 * 10/2003 Takahashi ..................... 348/445

FOREIGN PATENT DOCUMENTS

JP 09-182014 7/1997

* cited by examiner

*Primary Examiner*—Huy T Nguyen
(74) *Attorney, Agent, or Firm*—Rader Fishman & Grauer PLLC; Ronald P. Kananen

(57) ABSTRACT

In an information-recording apparatus and the like according to the invention, digital information is recorded in a magnetic tape according to a recording format in which two types of sync lengths exist. The recorder records digital information having a first information-recording length and digital information having a second information-recording length, which is shorter than the first information-recording length in the magnetic tape. The recorder records a CTL signal serving as a reference during reproduction of the digital information between a recording portion of the digital information having the first information-recording length and a recording portion of the digital information having the second information-recording length. A gap portion between the recording portions of digital information having different sync lengths and a recording portion of a CTL signal are utilized as a signal processing space required for carrying out error correction such as C1 correction during reproduction of the digital information.

12 Claims, 12 Drawing Sheets

BACK OF "M" IS OVERTAKEN AND DESTROYED BY "N"

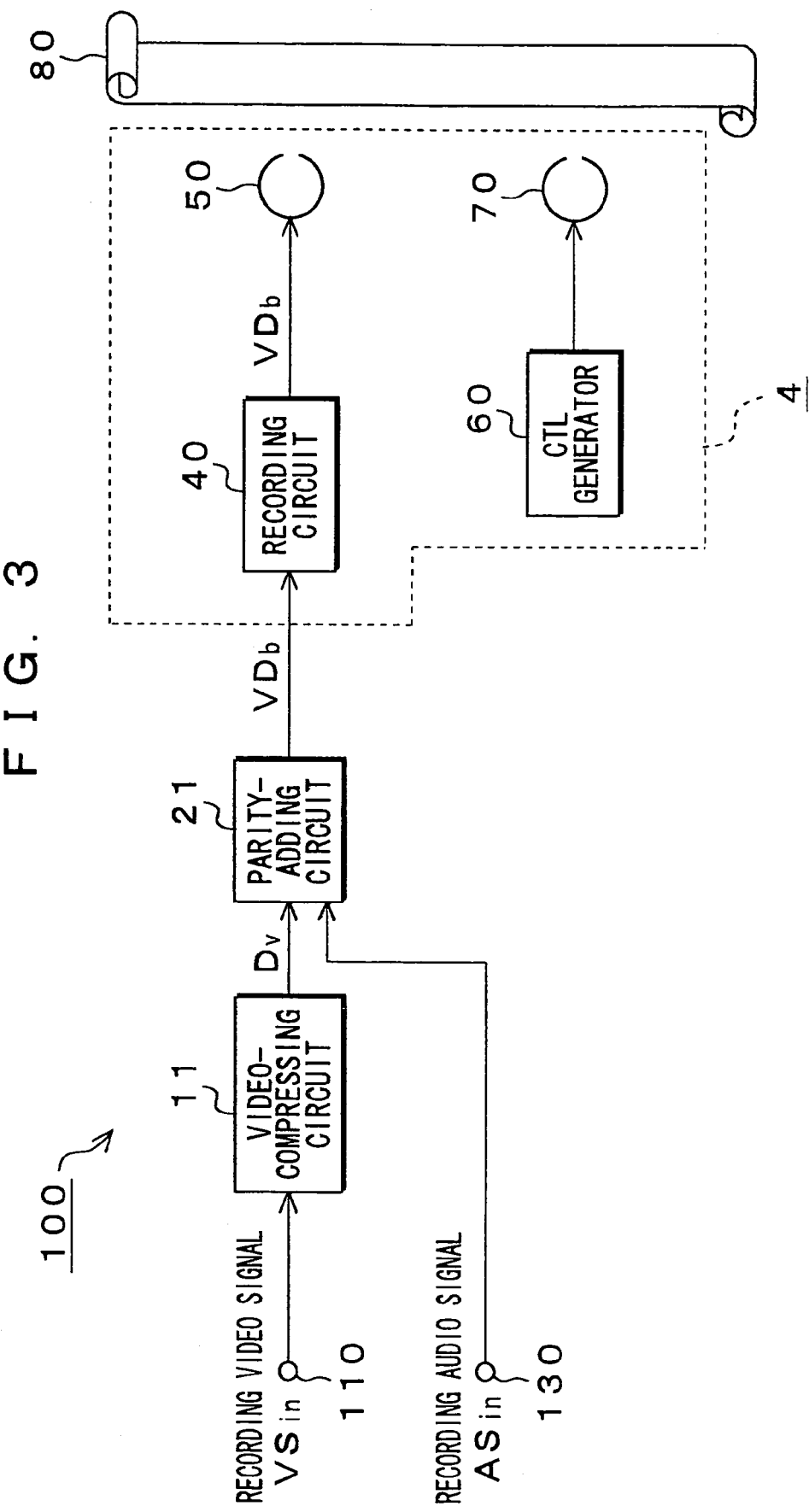

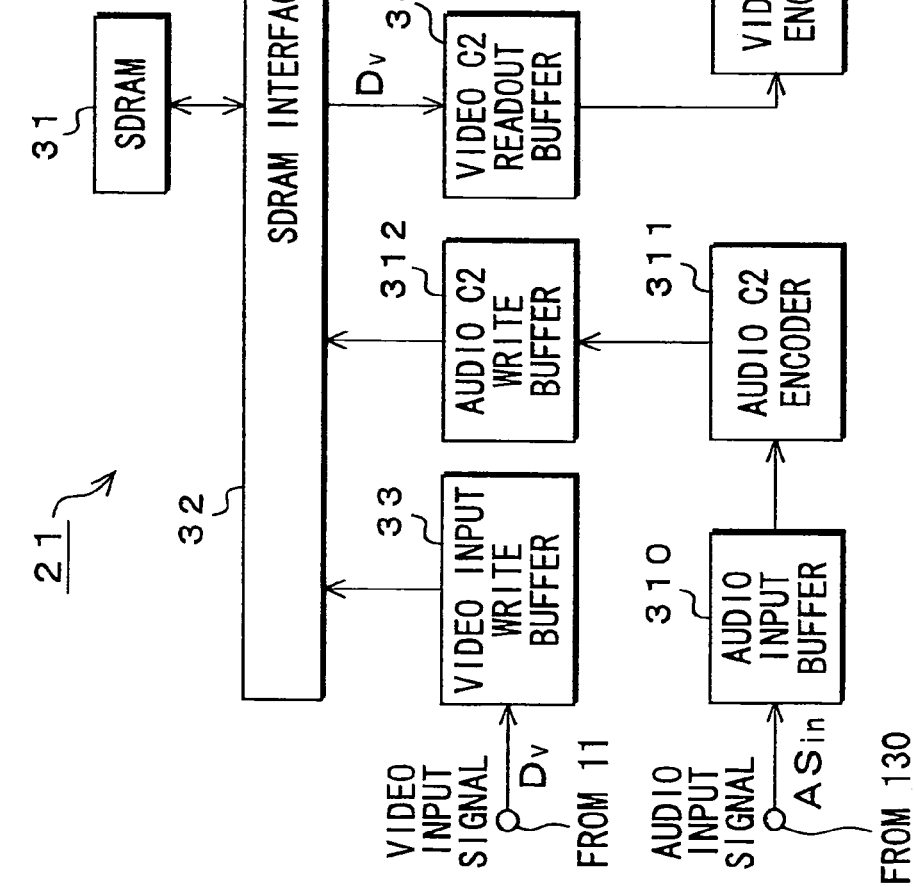

50 : RECA~RECH    55 : PBA~PBH

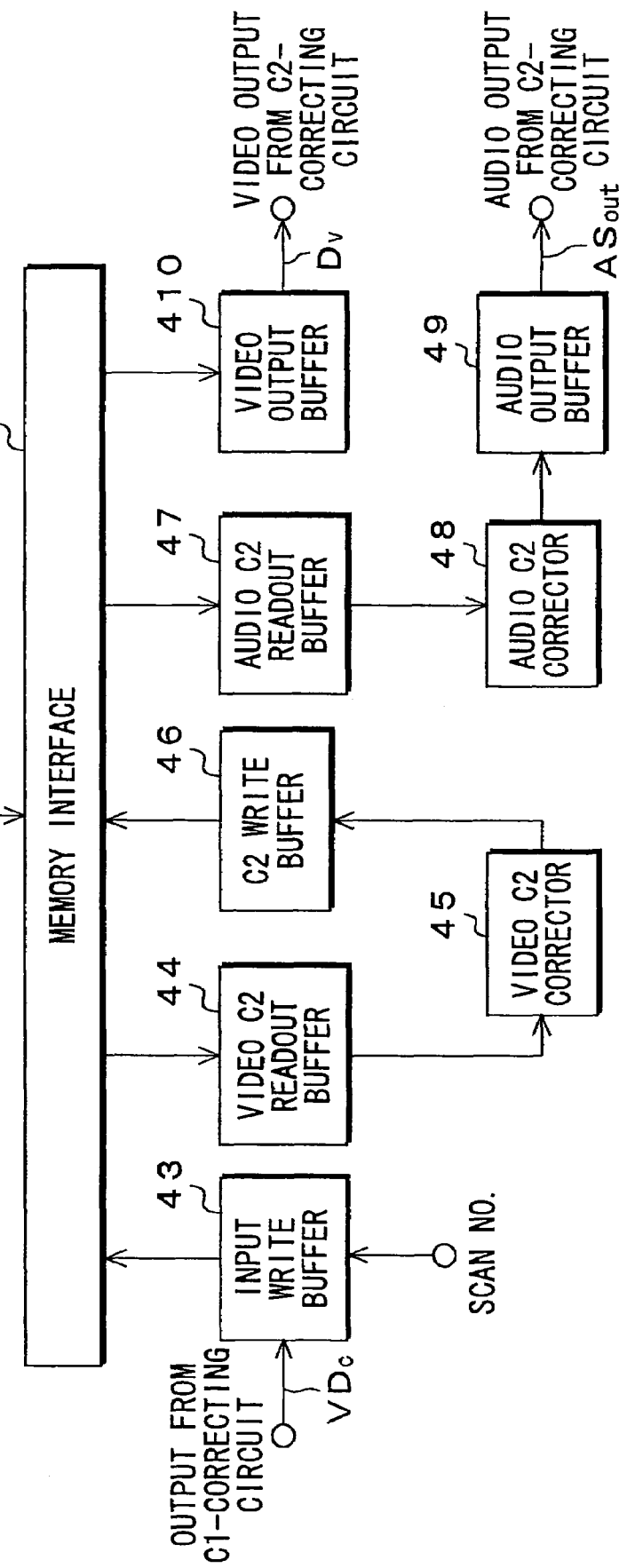

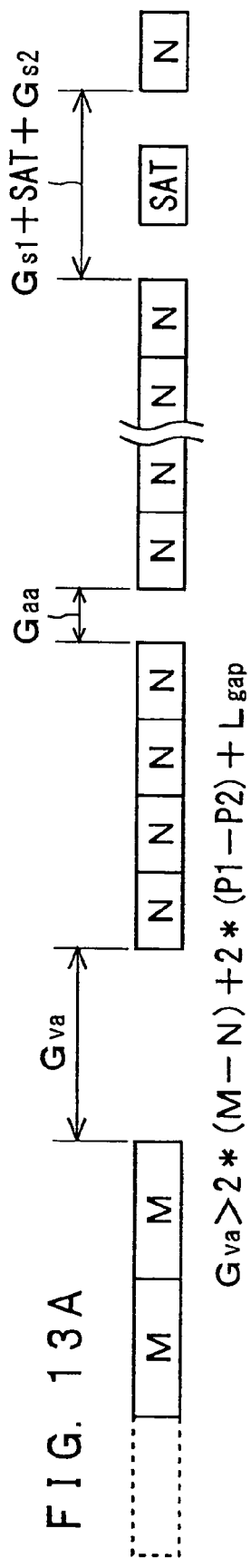
FIG. 13A CONVENTIONAL SYSTEM
$G_{va} > 2*(M-N) + 2*(P1-P2) + L_{gap}$
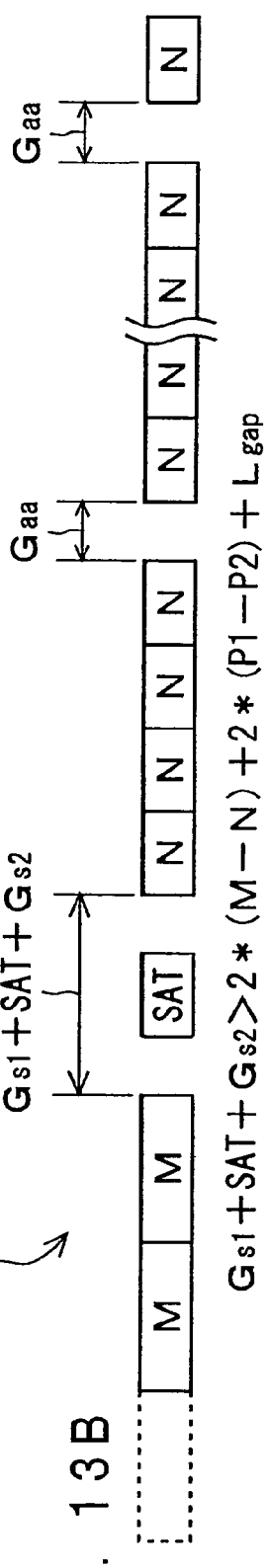
FIG. 13B SYSTEM ACCORDING TO THE PRESENT INVENTION
$G_{s1} + SAT + G_{s2} > 2*(M-N) + 2*(P1-P2) + L_{gap}$

INFORMATION-RECORDING APPARATUS, INFORMATION-RECORDING METHOD, INFORMATION-REPRODUCING APPARATUS, INFORMATION-REPRODUCING METHOD, AND INFORMATION-RECORDING MEDIUM

BACKGROUND OF THE INVENTION

1. Field of the Invention

The present invention relates to an information-recording apparatus, an information-recording method, an information-reproducing apparatus, an information-reproducing method, and an information-recording medium which are suitably applicable to a video recording and reproducing apparatus for home use or business use, for reproducing digital information from a tape recording medium.

2. Description of Related Art

In recent years, a video-reproducing apparatus for reproducing digital information such as video data and audio data from a tape recording medium has been often used as home use or business use. Such video-reproducing apparatus mounts a cassette having a magnetic tape wound around its reel. Eight reproducing magnetic heads (herein after, referred to as "reproducing heads") reproduce video data and audio data that has recorded in a magnetic tape. Video data and audio data are recorded in the magnetic tape according to a predetermined recording format (herein after, referred to as "VTR format").

FIG. 1 is a view for showing an example of a conventional VTR footprint in which a video sync (M) and an audio sync (N) coexist. The conventional VTR footprint (ECC configuration and data recording format) shown in FIG. 1 is provided as a format recorded by a helical recording head (not shown). In 12 tracks of the footprint shown in FIG. 1, a video sync (sync (M)) is allocated to an upper position of a magnetic tape 80. In this video sync (M), 36 ECC blocks (data in units of encoding) from table 0 to table 35 are recorded.

In addition, a video sync (M) is allocated to a lower position of the magnetic tape 80 shown in FIG. 1. In this video sync (M), 36 ECC blocks (data in units of encoding) from table 0 to table 35 are recorded. The size of each of the video syncs (M) of the upper and lower positions is 12 tracks×189 bytes. An audio sync (N) is allocated between the video syncs (M) of the upper and lower positions, and audio data Da is recorded therein. The audio sync (N) is segmented into eight segments, and the size of one segment is 4 bytes×12 tracks.

Here, assuming that a recording head is scanned from a side of the video sync (M) of a lower position to a side of the video sync (M) of upper position, items of audio data A1, A9, and A5 are allocated to a first segment; items of audio data A2, A10, and A6 are allocated to a second segment; items of audio data A3, A11, and A7 are allocated to a third segment; items of audio data A4, A12, and A8 are allocated to a fourth segment; items of audio data A5, A1, and A9 are allocated to a fifth segment; items of audio data A6, A2, and A10 are allocated to a sixth segment; items of audio data A7, A3, and A11 are allocated to a seventh segment; and items of audio data A8, A4, and A12 are allocated to an eighth segment, respectively.

In addition, a gap Gav is allocated between the video sync (M) of upper position and an audio sync (N) of the eighth segment. A gap Gaa is allocated between audio syncs of each segment. A servo pilot (servo control signal: CTL signal) is allocated between an audio sync (N) of the fourth segment and an audio sync (N) of the fifth segment. A gap Gs1 is allocated between this servo pilot and an audio sync (N) of the fourth segment and a gap Gs2 is allocated between the servo pilot and an audio sync (N) of the fifth segment. A gap Gva is allocated between an audio sync (N) of the first segment and the video sync (M) of the lower position. This is because a signal processing space is allocated during reproduction.

In the meantime, in a VTR format in which two types of sync lengths exist, as described above, in addition to the above edit gaps, there is a need for providing a space for signal processing between a video sync (M) and an audio sync (N), which is required for carrying out C1 correction processing. This principle is shown in FIG. 2. FIGS. 2A and 2B are timing charts each showing an example of MN switching in a C1-correcting circuit.

In general, C1 correction processing requires a delay according to a sync length. This delay can be expressed in a form such that a sync length and a length of its C1 parity are multiplied by a coefficient. In actuality, this coefficient is different depending on the C1-correcting circuit. In examples shown in FIG. 2A and FIG. 2B, however, both of the coefficients relevant to a sync length and a parity are defined as 2.

FIG. 2A shows a case in which a gap Gva at a portion moving a video sync (M) to an audio sync (N) is sufficiently long. The gap Gva is set between the video sync (M) and the audio sync (N) in a current data string. Here, a delay according to parity calculation relevant to a sync length M is defined as P1, and a delay according to parity calculation relevant to a sync length N is defined as P2.

A delay of C1 correction processing relevant to this sync length N is shorter than that relevant to a video sync (M). However, since the gap Gva is sufficiently long, the video sync (M) and the audio sync (N) in the next data string do not collide with each other at an output of the C1-correcting circuit. Namely, even if a processing time of (M+P1)×2 is taken for C1 correction processing according to the video sync (M), the gap Gva is set to be sufficiently long. Thus, C1 correction processing according to the audio sync (N) in the next data string can be carried out after an elapse of time of (M+P2)×2 from a time point when the audio sync (N) of the current data string is input to the C1-correcting circuit, following an input of the video sync (M) of the current data string.

FIG. 2B shows a case in which a gap Gva−1 at a portion moving from a video sync (M) to an audio sync (N) is shorter than the above gap Gva. The gap Gva−1 is set between the video sync (M) and the audio sync (N) in a current data string. A delay of C1 correction processing relevant to this sync length N is also shorter than that relevant to the video sync (M). Thus, since the gap Gva' is not sufficient, the video sync (M) and the audio sync (N) in the next data string collide with each other at an output of the C1-correcting circuit.

In the meantime, according to a VTR footprint of the conventional style, the following problems arise.

(1) A servo pilot is allocated in the middle of a recording track of the magnetic tape 80 shown in FIG. 1. The audio syncs (N) are allocated in front of or at the rear of the servo pilot. Further, the video syncs (M) are allocated in front of or at the rear of the audio syncs. Therefore, this allocation causes waveform reduction relevant to an effective track length limited in the magnetic tape 80.

(2) In addition, C1 correction processing according to a video sync (M) is carried out at a portion moving from the video sync (M) to an audio sync (N) shown in FIG. 2B, namely, by taking a processing time of (M+P1)×2. However, since a gap Gva−1 is not set to be sufficiently long, the C1 correction processing according to the audio sync (N) of next data string is carried out after an elapse of time of (M+P2)×2 from a time point when the audio sync (N) of current data string is input to the C1-correcting circuit, following an input of the video sync (M) of the current data string. As a result, the back of the video sync (M) of the next data string is overtaken by the audio sync (N) of the next data string, and thus, the data is destroyed.

The present invention has been made in order to solve the foregoing problems. It is an object of the present invention to provide an information-recording apparatus, an information-recording method, an information-reproducing apparatus, an information-reproducing method, and an information-recording medium, which are capable of utilizing a gap portion between the recording portions of digital information having different information-recording lengths and a recording portion of a servo control signal as a signal processing space required for carrying out error correction processing such as C1 correction processing during reproduction of digital information.

SUMMARY OF THE INVENTION

According to an aspect of the invention, an information-recording apparatus for recording digital information in an information-recording medium in accordance with a recording format in which two types of information-recording lengths exist. The digital information includes first digital information having a first information-recording length and second digital information having a second information-recording length. The second information-recording length is shorter than the first information recording length. The information-recording apparatus comprises a recorder for recording the first digital information and the second digital information in the information-recording medium. The recorder records a servo control signal between a recording portion of the first digital information having the first information-recording length and a recording portion of the second digital information having the second information-recording length. The servo control signal serves as a reference during reproduction of the first digital information and the second digital information.

With the information-recording apparatus according to the present invention, in a case where digital information is recorded in accordance with a recording format in which two types of information-recording lengths exist, the recorder records in an information-recording medium the first digital information having a first information-recording length and the second digital information having a second information-recording length which is shorter than the first information-recording length. The recorder also records a servo control signal between a recording portion of the first digital information having the first information-recording length and a recording portion of the second digital information having the second information-recording length.

This allows a gap portion between the recording portion of the first digital information having the first information-recording length and the recording portion of the second digital information having the second information-recording length, and a recording portion of the servo control signal to be utilized as a signal-processing space required for carrying out error correction processing such as C1 correction processing during reproduction of digital information.

According to another aspect of the invention, an information-recording method is provided for recording digital information in an information-recording medium in accordance with a recording format in which two types of information-recording lengths exist. The digital information includes first digital information having a first information-recording length and second digital information having a second information-recording length. The second information-recording length is shorter than the first information recording length. In the method, the first digital information and the second digital information are recorded in the information-recording medium. A servo control signal is recorded between a recording portion of the first digital information having the first information-recording length and a recording portion of the second digital information having the second information-recording length. The servo control signal serves as a reference during reproduction of the first and second digital information.

With the information-recording method according to the present invention, a gap portion between the recording portion of the first digital information on the first information-recording length and the recording portion of the second digital information on the second information-recording length, and a recording portion of the servo control signal are utilized as a signal-processing space required for carrying out error correction processing such as C1 correction processing during reproduction of the first and second digital information.

According to further aspect of the invention, an information-reproducing apparatus is provided for reproducing digital information from an information-recording medium having a recording format in which two types of information recording lengths exist. In this aspect, the digital information includes first digital information having a first information-recording length and second digital information having a second information-recording length. The second information-recording length is also shorter than the first information recording length. The information-reproducing apparatus comprises a reproducer for reproducing the first digital information and the second digital information from the information-recording medium. The reproducer reproduces a servo control signal between a recording portion of the first digital information having the first information-recording length and a recording portion of the second digital information having the second information-recording length. The servo control signal serves as a reference during reproduction of the first digital information and the second digital information.

With the information-reproducing apparatus according to the present invention, in the case where digital information is reproduced from the information-recording medium having a recording format in which two types of information recording lengths exist, the reproducer reproduces first digital information having a first information-recording length and second digital information having a second information-recording length, which is shorter than the first information-recording length, from the information-recording medium. In addition, the servo control signal serving as a reference during reproduction of the first and second digital information is reproduced between a recording portion of the first digital information having the first information-recording length and a recording portion of the second digital information having the second information-recording length, which is shorter than the first information-recording length.

Therefore, a gap portion between the recording portion of the first digital information having the first information-recording length and the recording portion of the second digital information having the second information-recording length, and a recording portion of the servo control signal is utilized as a signal-processing space required for carrying out error correction processing such as C1 correction processing. In this manner, before error correction processing of the first digital information having the first information-recording length completes, error correction processing of the second digital information having the second information-recording length, which is shorter than the first information recording length, is started, and a circumstance in which information processing is made complicated can be prevented.

According to still further aspect of the present invention, an information-reproducing method is provided for reproducing digital information from an information-recording medium having a recording format in which two types of information recording lengths exist. In this method, the digital information including first digital information having a first information-recording length and second digital information having a second information-recording length. The second information-recording length is also shorter than said first information recording length. In the method, the first digital information and the second digital information are produced from the information-recording medium. A servo control signal is produced between a recording portion of the first digital information having the first information-recording length and a recording portion of the second digital information having the second information-recording length. The servo control signal serves as a reference during reproduction of the first and second digital information.

With the information-reproducing method according to the present invention, in the case where digital information is reproduced from an information-recording medium having a recording format in which two types of information recording lengths exist, a gap portion between the recording portion of the first digital information having the first information-recording length and the recording portion of the second digital information having the second information-recording length, and a recording portion of the servo control signal are utilized as a signal-processing space required for carrying out error correction processing such as C1 correction processing.

Therefore, before error correction processing of the first digital information having the first information recording length completes, error correction processing of the second digital information having the second information-recording length, which is shorter than the first information-recording length, is started. Thus, a circumstance in which information processing is made complicated can be prevented.

According to still another aspect of the present invention, an information-recording medium is provided for allowing digital information to be recorded therein in accordance with a recording format in which two types of information recording lengths exist. In the medium, the digital information including first digital information having a first information-recording length and second digital information having a second information-recording length. The second information-recording length is also shorter than the first information-recording length. In the medium, a servo control signal serving as a reference during reproduction of the first and second digital information is recorded between the first and second digital information.

With the information-recording medium according to the present invention, a gap portion between the recording portion of the first digital information having the first information-recording length and the recording portion of the second digital information having the second information-recording length, and a recording portion of the servo control signal are utilized as a signal-processing space required for carrying out error correction processing such as C1 correction processing.

Therefore, before error correction processing of the first digital information having the first information-recording length completes, error correction processing of the second digital information having the second information-recording length, which is shorter than the first information-recording length is started. Thus, a circumstance in which information processing is made complicated can be prevented. Moreover, a wavelength can be increased to the maximum relevant to an effective track length limited in the information-recording medium.

Additional objects and advantages of the invention will be set forth in the description that follows, and in part will be obvious from the description, or may be learned by practice of the invention. The objects and advantages of the invention may be realized and obtained by means of the instrumentalities and combinations particularly pointed out herein after.

BRIEF DESCRIPTION OF THE SEVERAL VIEWS OF THE DRAWINGS

The accompanying drawings, which are incorporated in and constitute apart of the specification, illustrate presently preferred embodiments of the present invention and, together with the general description given above and the detailed description of the preferred embodiments given below, serve to explain the principle of the present invention.

FIG. 3 is a block diagram for depicting a configuration of a recording system of VTR 100 obtained by applying an information-recording apparatus according to one embodiment of the present invention;

FIG. 4 is a block diagram for depicting an internal configuration of a parity-adding circuit 21;

FIG. 12 is a block diagram for depicting an internal configuration of a C2-correcting circuit 82; and FIG. 13A and FIG. 13B are time charts each comparing an example of a signal-processing space provided by a servo pilot between a video sync (M) and an audio sync (N) with respect to the conventional system and the system according to the present invention.

DETAILED DESCRIPTION OF THE INVENTION

Figure 1:
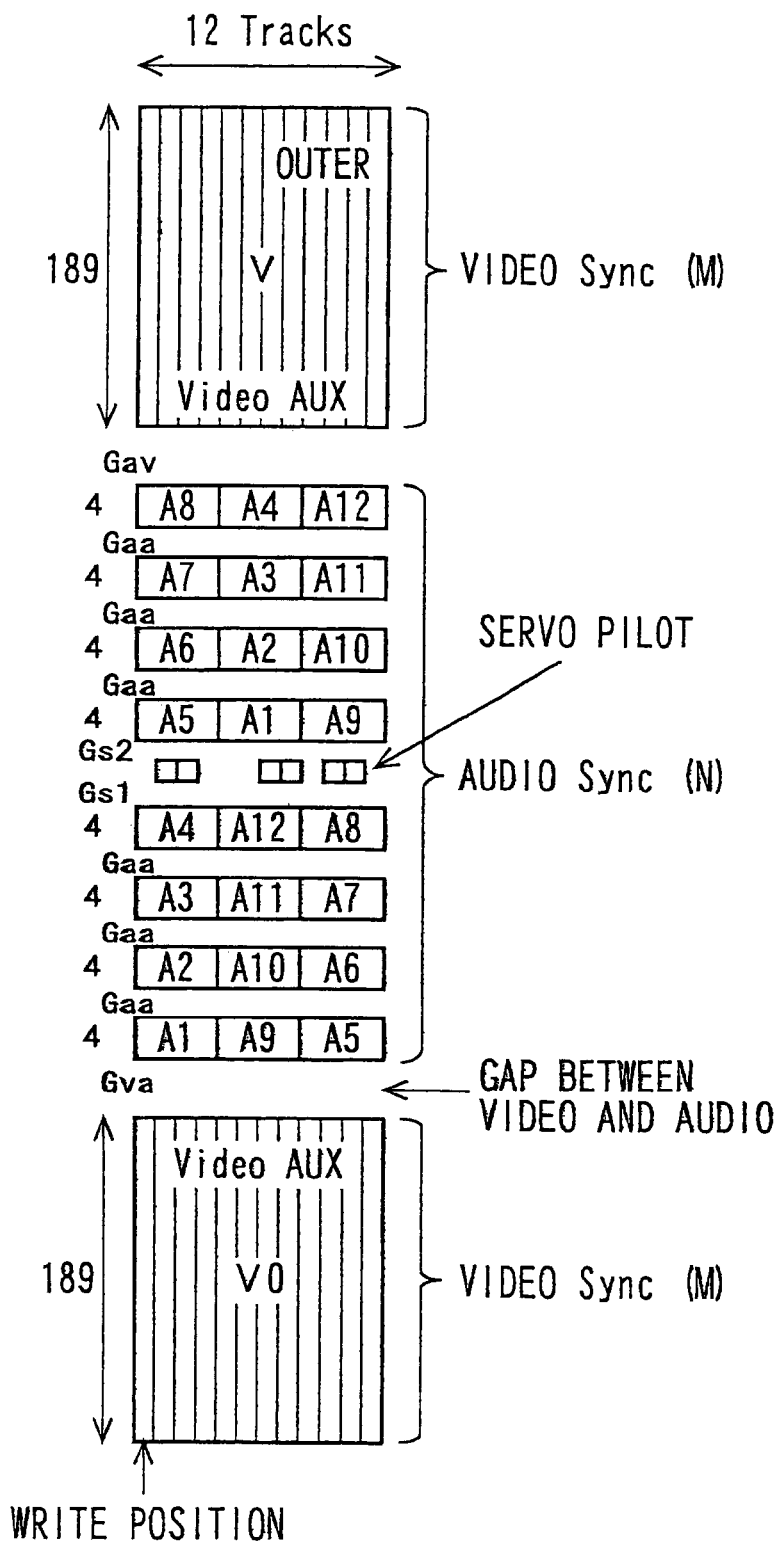
FIG. 1 is a view for showing an example of a VTR format (footprint) in which a video sync (M) and an audio sync (N) coexist according to the prior art.
Figure 2A:
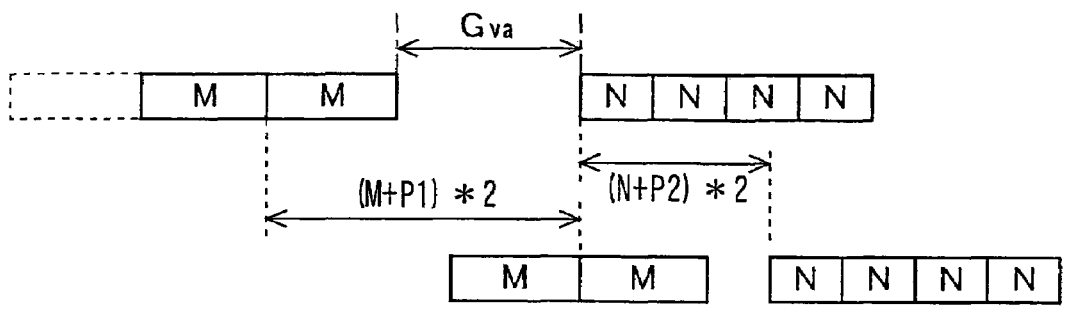
FIG. 2A and FIG. 2B are timing charts each showing an example of MN switching of a C1 corrector circuit.
Figure 2B:
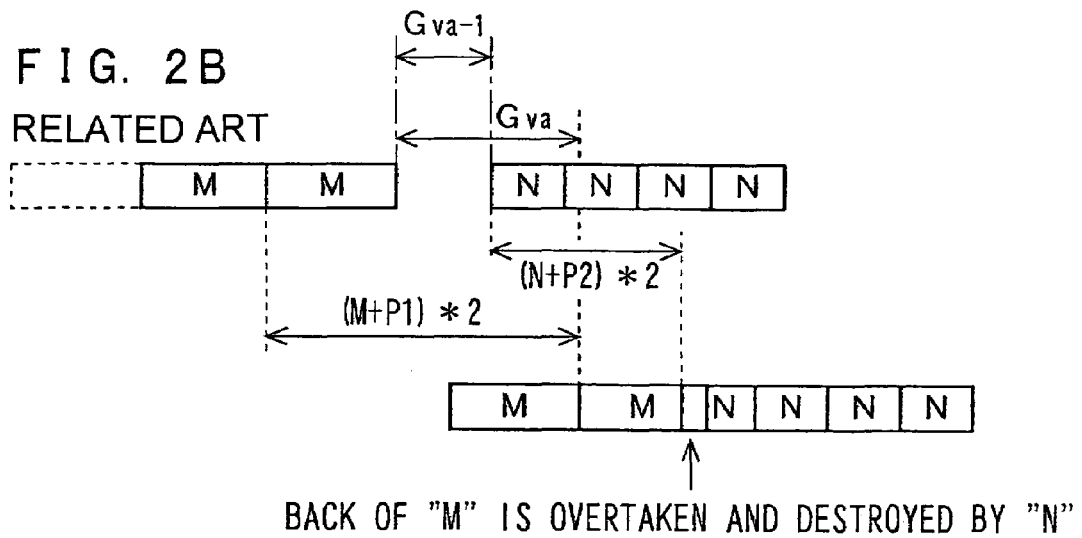

Reference will now be made in detail to the presently preferred embodiments of the invention as illustrated in the accompanying drawings, in which like reference numerals designate like or corresponding parts.

Hereinafter, one preferred embodiment of an information-recording apparatus, an information-recording method, an information-reproducing apparatus, an information-reproducing method, and an information-recording medium according to the present invention will be described with reference to the accompanying drawings.

[Information-Recording Apparatus]

FIG. 3 is a block diagram for depicting a configuration of a recording system of VTR 100 obtained by applying an information-recording apparatus according to one embodiment of the present invention.

In the present embodiment, the information-recording apparatus comprises a recorder for recording digital information in the information-recording medium in accordance with a recording format in which two types of information recording lengths exist. The recorder records digital information having a first information-recording length and other digital information having a second information-recording length, which is shorter than the first information-recording length in an information-recording medium. The recorder also records a servo control signal serving as a reference during reproduction of these items of digital information between a recording portion of the digital information having the first information-recording length and the digital information having the second information-recording length, which is shorter than the first information-recording length. Thus, a gap portion between a recording portion of the digital information having the first information-recording length and a recording portion of the digital information having the second information-recording length and a recording portion of the servo control signal are utilized as a signal-processing space required for carrying out error correction processing such as C1 correction processing during reproduction of these items of digital information.

In FIG. 3, the VTR (Video Tape Recorder) is provided as one example of an information-recording apparatus. This VTR is provided as a device for recording the digital information in a magnetic tape 80 serving as one example of an information-recording medium in accordance with a recording format in which two types of information recording lengths (herein after, referred to as "sync lengths") exists.

In FIG. 3, the VTR 100 has a video input terminal 110 and an audio input terminal 130. A video-compressing circuit 11 is connected to the video input terminal 110, and receives and compresses a recording video signal VSin output from a video camera or the like. For example, in the video compressor circuit 11, the recording video signal VSin is divided into a two-dimensional blocks each having 8×8 pixels, and data compression processing using block encoding such as DCT is carried out.

A parity-adding circuit 21 is connected to the above-described video-compressing circuit 11 and the audio input terminal 130. The parity-adding circuit 21 receives video data (compression and encoding data) Dv thus compressed and a recording audio signal ASin. Error correction and encoding processing is performed on the compression and encoding data Dv using a product code in units of encoding; and error correction and encoding processing is performed on the recording audio signal ASin using a product code.

Recorder 4 is connected to the parity-adding circuit 21, and records in the magnetic tape 80 video data (digital information) having a first sync length and audio data (digital information) having a second sync length, which is shorter than the first sync length. This recorder 4 also records a servo control signal (herein after, referred to as a "CTL signal"), which is a reference during reproduction of the items of digital information, between a recording portion of the video data (digital information) having the first sync length and the audio data (digital information) having the second sync length.

For example, the recorder 4 has a recording circuit 40, helical recording head 50, a CTL generator 60, and a CTL recording head 70. The recording circuit 40 receives and amplifies video data (error correction and encoding data) VDb output from the parity-adding circuit 21, and outputs the error correction and encoding data VDb thus amplified to the helical recording head 50. The helical recording head 50 sequentially records the error correction and encoding data VDb in a recording track of the magnetic tape 80.

The CTL generator 60 generates a CTL signal serving as a reference during reproduction of error correction and encoding data (digital information) VDb and modulates this CTL signal to output the modulated CTL signal to the CTL recording head 70. The CTL recording head 70 records in the magnetic tape 80 the CTL signal thus modulated, which is output from the CTL generator 60.

FIG. 4 is a block diagram for depicting an internal configuration of a parity adder circuit 21. The parity-adding circuit 21 shown in FIG. 4 has an SDRAM (Synchronous Dynamic RAM) 31 and an SDRAM interface 32 serving as an interface for carrying out writing and reading the data into and out of this SDRAM (Synchronous Dynamic RAM) 31. The SDRAM 31 has a capacity capable of storing video data Dv having a plurality of fields. In this case, in the SDRAM 31, a memory space corresponding to 36 ECC blocks is provided with respect to each of the fields of Rch and Lch.

A video input write buffer 33 is connected to this SDRAM interface 32, and is used as a buffer for writing in the SDRAM 31 the video data (compression and encoding data) Dv received from the above-described video compressor circuit 11. A video C2 readout buffer 34 is connected to the SDRAM interface 32, and is used as a buffer for supplying to a video C2 encoder 35, described later, the video data Dv corresponding to 36 ECC blocks read out of the SDRAM 31.

The C2 encoder 35 is connected to this C2 readout buffer 34, and is used to compute C2 parities (external code parities) in 36 ECC blocks with respect to each field. The C2 encoder 35 has 36 computers for computing C2 parities, and is provided so as to compute in parallel the C2 parities in the above-described 36 ECC blocks. Thus, the items of video data corresponding to the 36 ECC blocks are supplied in parallel from the C2 readout buffer 34 to the C2 encoder 35. In this case, the video data on each of the ECC blocks is supplied in order of sync-block data from 0 to 113.

In addition, a C2 write buffer 36 is connected to the C2 encoder 35, and is used as a buffer for writing into the SDRAM 31 the C2 parities in 36 ECC blocks, which has computed in the C2 encoder 35 with respect to each field. Further, an output readout buffer 37 is connected to the SDRAM interface 32, and is used as a buffer for outputting the video data and C2 parities corresponding to 36 ECC blocks, which are read out of the SDRAM 31 with respect to each field.

Video data Dv is input in order of C1=Sync. This is because compression macro-blocks are padded in sync units. By doing this, in the case where one sync is hit during shuttle reproduction, the corresponding macro-block can be updated. Therefore, the video data Dv is written in the C1 direction, and is read out in the C2 direction so as to carry out C2 correction processing. In contrast, the audio data Da does not require processing identical to the video data Dv, and is written into the SDRAM 31 after the C2 code has been multiplied.

For example, an audio input buffer 310 is connected to the SDRAM interface 32, and is used as a buffer for receiving a recording audio signal ASin from an audio input terminal 130. An audio C2 encoder 311 is connected to the input buffer 310, and is provided so as to compute C2 parities (external code parities) in 24 ECC blocks. In this C2 correction processing, recording audio signals ASin are sequentially input in the order of C2 row. An audio C2 write buffer 312 is connected to the C2 encoder 311, and is used as a buffer for writing the audio data Da and C2 parities corresponding to 24 ECC blocks into the SDRAM 31 via the SDRAM interface 32.

Furthermore, a SYNC/ID adding circuit 38 is connected to the output readout buffer 37, and is provided so as to add sync data and an ID to a data row of video data (or C2 parity) in each sync-block, which is output in a recorded order from the output readout buffer 37. A C1 encoder 39 is connected to this SYNC/ID adding circuit 38, and is provided so as to compute and add C1 parities to video data and audio data Da on each sync-block to which sync data and ID are added, and output recording data VDb, which is acquired according to a formula of the video data Dv+audio data Da.

Figure 5:
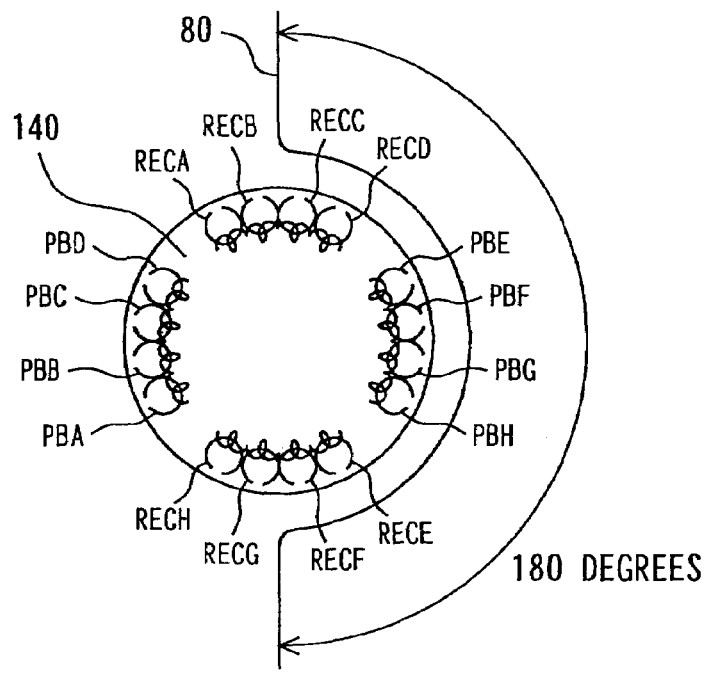
FIG. 5 is a conceptual view for showing a configuration of a rotary drum 140 according to the VTR 100 shown in FIG. 3.

FIG. 5 is a conceptual view showing a configuration of a rotary drum 140 according to the VTR 100 shown in FIG. 3. The rotary drum 140 shown in FIG. 5 is equipped with a helical recording head (magnetic head) 50 and a helical reproducing head 55 described later. For example, the magnetic tape 80 is wound obliquely around the rotary drum 140 with a winding angle of 180 degrees. The magnetic tape 80 runs at a predetermined speed while the tape is thus wound.

In addition, four recording heads RECA to RECD are allocated to the rotary drum 140, and four recording heads RECE to RECH are allocated to these four recording heads RECA to RECD with an angle internal of 180 degrees. Further, at the rotary drum 140, eight reproducing heads PBA to PBH corresponding to the recording heads RECA to RECH are allocated to the recording heads RECA to RECH, respectively, with an angle internal of 180 degrees. Namely, the helical recording head 50 is composed of eight recording heads RECA to RECH, and the helical reproducing head 55 is composed of eight reproducing heads PBA to PBH.

Figure 6:
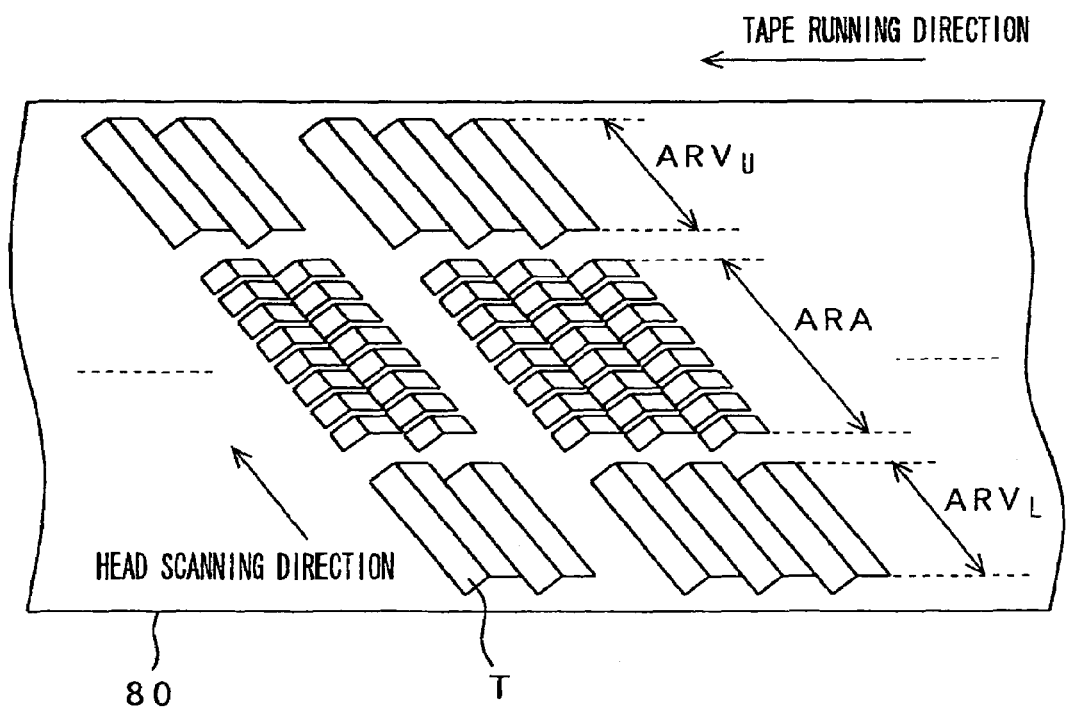
FIG. 6 is a view for showing an example of a recording format in a magnetic tape 80.

FIG. 6 is a view for showing an example of a recording format in the magnetic tape 80. Tracks T tilted with respect to its longitudinal direction are sequentially formed on the magnetic tape 80 as shown in FIG. 6. In this case, recording azimuths in the two tracks T adjacent to each other are different from each other. The respective video data regions $ARV_L$ and $ARV_U$ are allocated to a scanning start side and a scanning end side of the track T. The video data Dv output from the above-described parity-adding circuit 21 is recorded in these video data regions $ARV_L$ and $ARV_U$. In addition, the audio data region ARA is allocated to a region sandwiched between the video regions $ARV_L$ and $ARV_U$ of the track T. Audio data Da is recorded in this region ARA.

[Information-Recording Medium]

Figure 7:
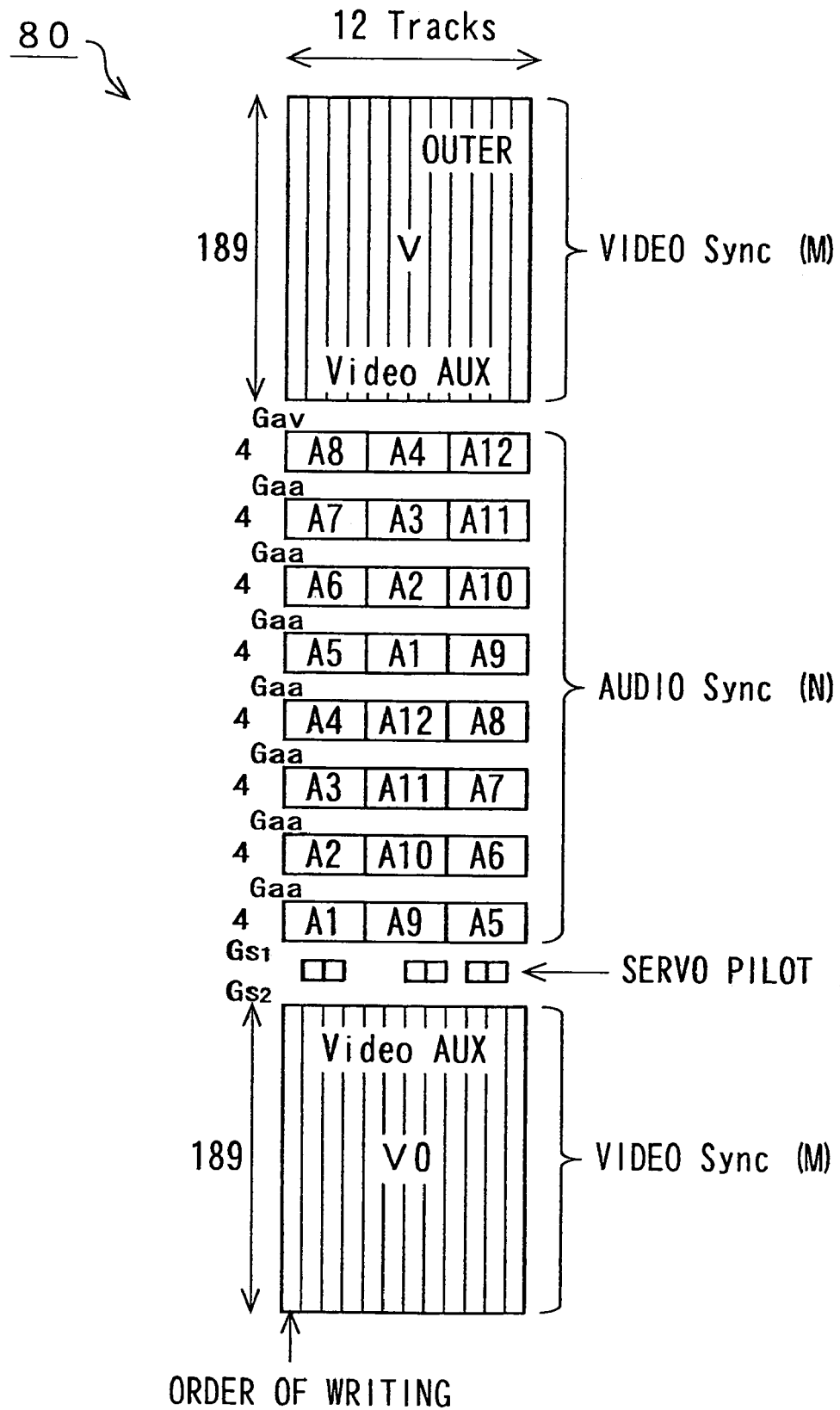
FIG. 7 is a view for showing an example of a VTR format (footprint) in which a video sync (M) and an audio sync (N) coexist.

FIG. 7 shows an example of a VTR format (footprint) in which a video sync (M) and an audio sync (N) coexist.

In the present embodiment, the magnetic tape 80 capable of recording digital information in accordance with a recording format in which two types of sync lengths exist records a CTL signal serving as a reference during reproduction of the digital information between a recording portion of digital information having a first sync length and a recording portion of digital information having a second sync length which is shorter than the first sync length. In addition, in this magnetic tape 80, video data Dv on one field is recorded in each of 12 tracks. During recording and reproducing, four tracks are scanned at the same time by four heads in one scan. Therefore, 12 tracks are scanned in three scans.

A footprint (ECC configuration and data recording format) shown in FIG. 7 is provided as a format recorded by the helical recording head 50 shown in FIG. 5. In this example, the video sync (M) is divided in front of and at the rear of a track, and a region of the audio sync (N) is allocated between the tracks. A servo pilot signal is allocated between a video sync (M) and a first audio sync (N). The number of edit gaps itself is equal to that in the conventional system. The servo pilot signal is positioned at a portion moving from the video sync (M) to the audio sync (N). This allows a sufficient signal processing space between the video sync (M) and the audio sync (N), which is required for carrying out C1 correction processing, to be secured.

In 12 tracks for the footprint shown in FIG. 7, the video data region $ARV_U$ shown in FIG. 6 is allocated to an upper video sync (sync: (M)), and this video sync (M) records 36 ECC blocks (data in units of encoding) from table 0 to table 35 as shown in FIG. 8A.

Figure 8A:
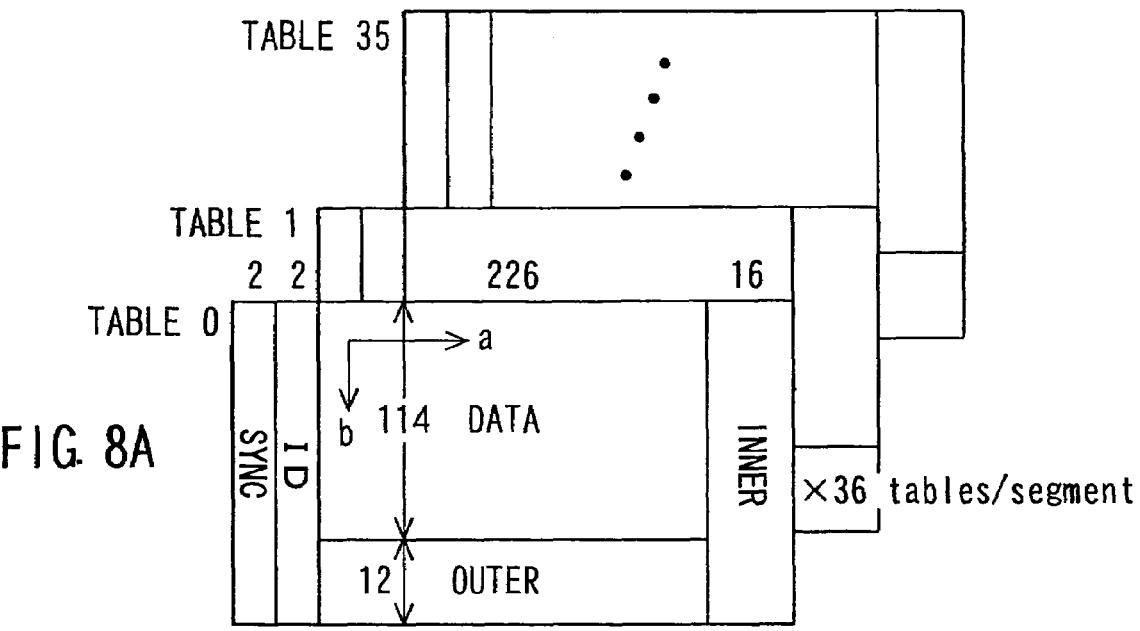
FIG. 8A and FIG. 8b are views each showing a configuration of one sync-block of each ECC block according to a product code of video data and audio data.

Similarly, the video data region $ARV_L$ shown in FIG. 6 is allocated in the lower video sync (M) shown in FIG. 7, and this video sync (M) also records 36 ECC blocks (data in units of encoding) from table 0 to table 35 as shown in FIG. 8A. The size of each of the upper and lower video syncs (M) is 12 tracks×189 bytes. An audio sync (N) is allocated between these upper and lower video syncs (M), and audio data Da is recorded therein. The audio sync (N) is divided into eight segments, and the size of one segment is 4 bytes×12 tracks.

Here, assuming that the helical recording head 50 as shown in FIG. 5 is scanned from a side of the lower video sync (M) to a side of the upper video sync (M). Thus, audio data A1, A9, and A5 are allocated to a first segment; audio data A2, A10, and A6 are allocated to a second segment; audio data A3, A11, and A7 are allocated to a third segment; audio data A4, A12, and A8 are allocated to a fourth segment; audio data A5, A1, and A9 are allocated to a fifth segment; audio data A6, A2, and A10 are allocated to a sixth segment; audio data A7, A3, and A11 are allocated to a seventh segment; and audio data A8, A4, and A12 are allocated to an eighth segment, respectively.

In addition, a gap Gav is allocated between the upper video sync (M) and the audio sync (N) of the eighth segment. A gap Gaa is allocated between audio syncs of each segment. A servo pilot (CTL signal) is allocated between the audio sync of the first segment and the lower video sync (M). A gap Gs1 is allocated between the audio sync of the first segment and the servo pilot. A gap Gs2 is allocated between this servo pilot and the lower video sync (M). This is because a signal processing space is secured during reproduction. One ECC block is configured as follows.

Figure 8B:
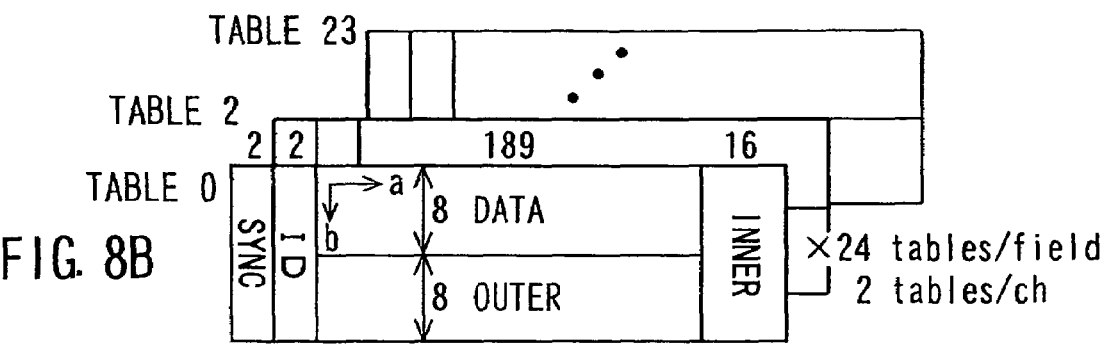

FIG. 8A and FIG. 8B are views each showing a configuration of one sync-block of the ECC block according to product codes of each of the video data and the audio data. With respect to video data consisting of a data array having 226 bytes×114 bytes shown in FIG. 8A, data in each column (a data string) is encoded by, for example, a (126, 114) Reed-Solomon code for an external code computation data series indicated by the arrow "b", thereby generating a C2 parity of 12 bytes (external code parity: OUTER).

Further, with respect to the video data and the C2 parity, data on each row (a data string) is encoded by, for example, a (242, 226) Reed-Solomon code for an internal code computation data series indicated by the arrow "a" shown in FIG. 7A, thereby generating a 16 byte C1 parity (internal code parity: INNER). In addition, sync data and an ID each having the size of 2 bytes are arranged at the head of each data row.

Namely, the first two bytes shown in FIG. 8A are sync data. The next 2 bytes are an ID. This ID includes: track ID for identifying which of 12 tracks records such one sync-block; and sync-block ID for identifying which of a plurality of sync-blocks recorded in one tilt track has such one sync-block. In addition, one segment is configured for 12 tracks, and segment numbers 0 to 3 are sequentially assigned repeatedly. The above-described ID of 2 bytes also includes a segment ID indicating a segment number of a segment having such one sync-block recorded therein. In addition, this ID is followed by video data (or C2 parity) of 226 bytes and a C1 parity of 16 bytes.

FIG. 8B shows a configuration of a product code of audio data Da. 24 ECC blocks (data in units of encoding) including table 0 to table 23 as shown in FIG. 7 are recorded in the audio Sync (N) of the footprint shown in FIG. 7. One ECC block is configured as follows.

That is, with respect to audio data consisting of a data array having 189 bytes×8 bytes, data on each column (a data string) is encoded by, for example, a (16, 8) Reed-Solomon code, for an external code computation data series indicated by the arrow "b", thereby generating a C2 parity of eight bytes (external code parity: OUTER). Further, with respect to the audio data and the C2 parity, data on each row (a data string) is encoded by, for example, a (205, 189) Reed-Solomon code, for an internal code computation data series indicated by the arrow "a" shown in FIG. 8B, thereby generating a C1 parity of 16 bytes (internal code parity: INNER). In addition, the sync data and ID each having the size of 2 bytes are arranged at the head of each data row.

Figure 9A:
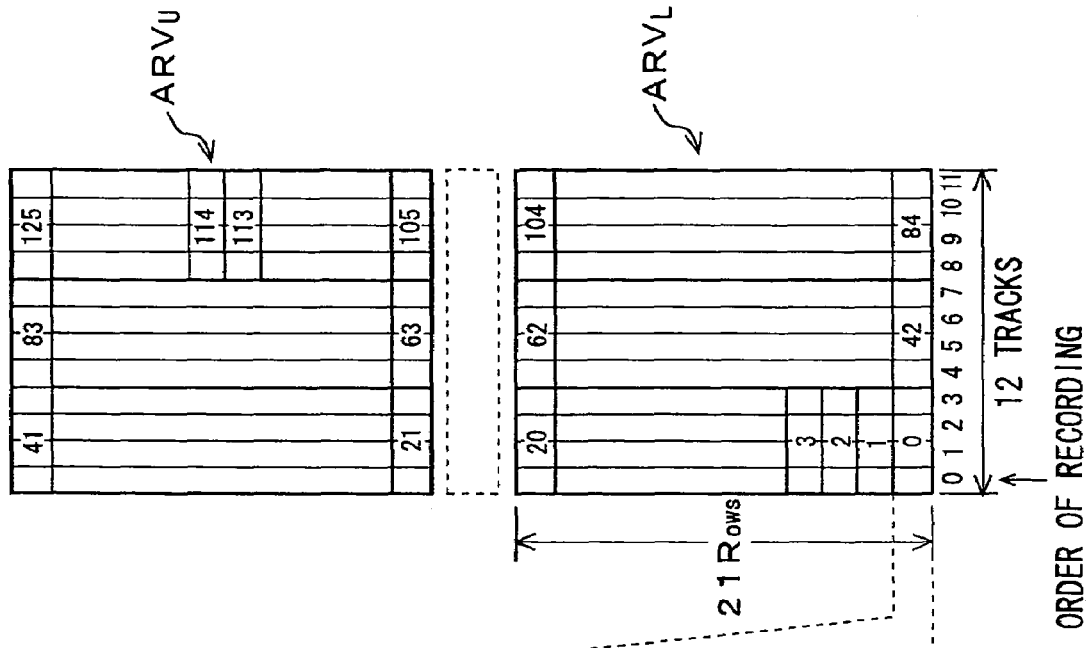
FIG. 9A to FIG. 9C are views each showing an allocation example (1) of one sync-block of each ECC block in video data regions $ARV_L$ and $ARV_U$ in 12 tracks consisting of one segment.
Figure 9B:
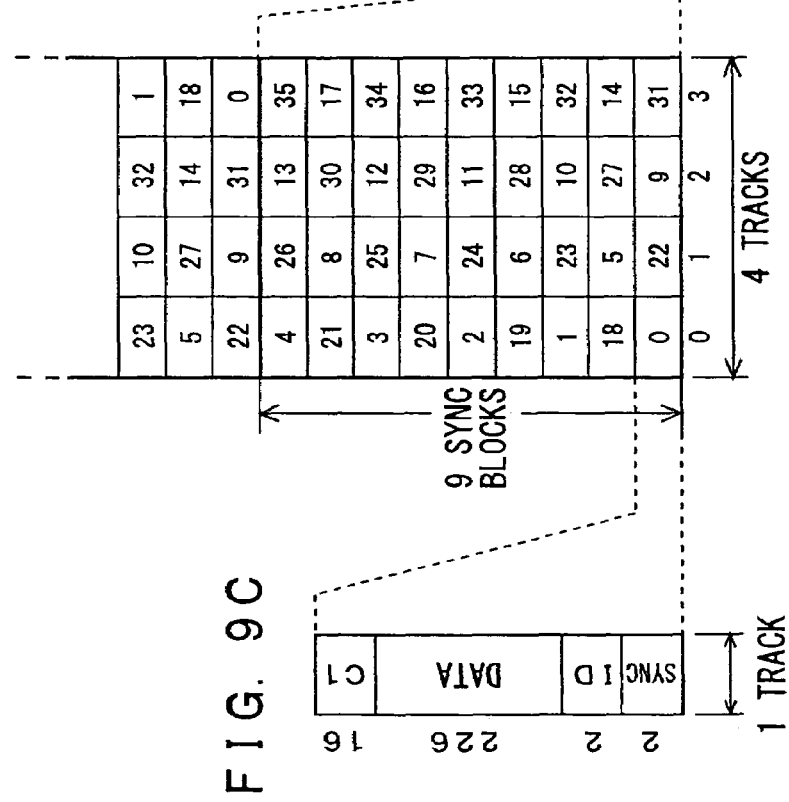
Figure 9C:
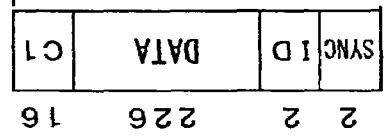

FIGS. 9A to 9C are views each showing an allocation example (1) of one sync-block of each ECC block in video data regions $ARV_L$ and $ARV_U$ in 12 tracks consisting of one segment. As shown in FIG. 9A, with respect to four tracks 0 to 3 scanned at a first time, sync-blocks in 21 rows including row 0 to row 20 in ECC blocks 0 to 35 are respectively recorded in the video data region $ARV_L$. Sync-blocks in 21 rows including row 21 to row 41 in ECC blocks 0 to 35 are respectively recorded in the video data region $ARV_U$.

In addition, with respect to four tracks 4 to 7 scanned at a second time, sync-blocks of 21 rows including row 42 to row 62 in ECC blocks 0 to 35 are respectively recorded in the video data region $ARV_L$; and sync-blocks of 21 rows including row 63 to row 83 in ECC blocks 0 to 35 are respectively recorded in the video data region $ARV_U$.

Further, with respect to four tracks 8 to 11 scanned at a third time, sync-blocks of 21 rows including row 84 to row 104 in ECC blocks 0 to 35 are respectively recorded in the video data region $ARV_L$; and sync-blocks of 21 rows including row 105 to row 125 in ECC blocks 0 to 35 are respectively recorded in the video data region $ARV_U$.

Here, a sync-block of row 0 is composed of a 0-th sync-block in each of the ECC blocks 0 to 35, and these 36 sync-blocks are recorded so as to be distributed into tracks 0 to 4 by 9 sync-blocks, as shown in FIG. 9B. Namely, track 0 records a 0-th sync-block in each of the ECC blocks 0, 18, 1, 19, 2, 20, 3, 21, and 4; track 1 records a 0-th sync-block in each of the ECC blocks 22, 5, 23, 6, 24, 7, 25, 8, and 26; track 2 records an 0-th sync-block in each of the ECC blocks 9, 27, 10, 28, 11, 29, 12, 30, and 13; and further, track 3 records an 0-th sync-block in each of the ECC blocks 31, 14, 32, 15, 33, 16, 34, 17, and 35.

Hereinafter, similarly, sync-blocks of 1 to 125 rows are composed of 1st to 125th sync-blocks in each of the ECC blocks 0 to 35; and respective 36 sync-blocks are recorded so that they are distributed to the corresponding 4 tracks by nine sync-blocks. In this case, ECC blocks from which nine sync-blocks recorded into each of the four tracks are acquired are rotated for each row. One sync-block, as shown in FIG. 9C, is composed of sync data of 2 bytes, an ID of 2 bytes, video data (or C2 parity) of 226 bytes, and a C1 parity of 16 bytes.

Here, sync-blocks of row 0 to row 125 are sequentially recorded into 12 tracks, 0 to 11. In this case, sync-blocks of row 0 to row 113 are provided by the C1 parity being added to a data row of video data consisting of an internal code computation data series. Sync-blocks of row 114 to row 125 are provided by a C1 parity being added to a data row of a C2 parity configuring an internal code computation data series.

Figure 10:
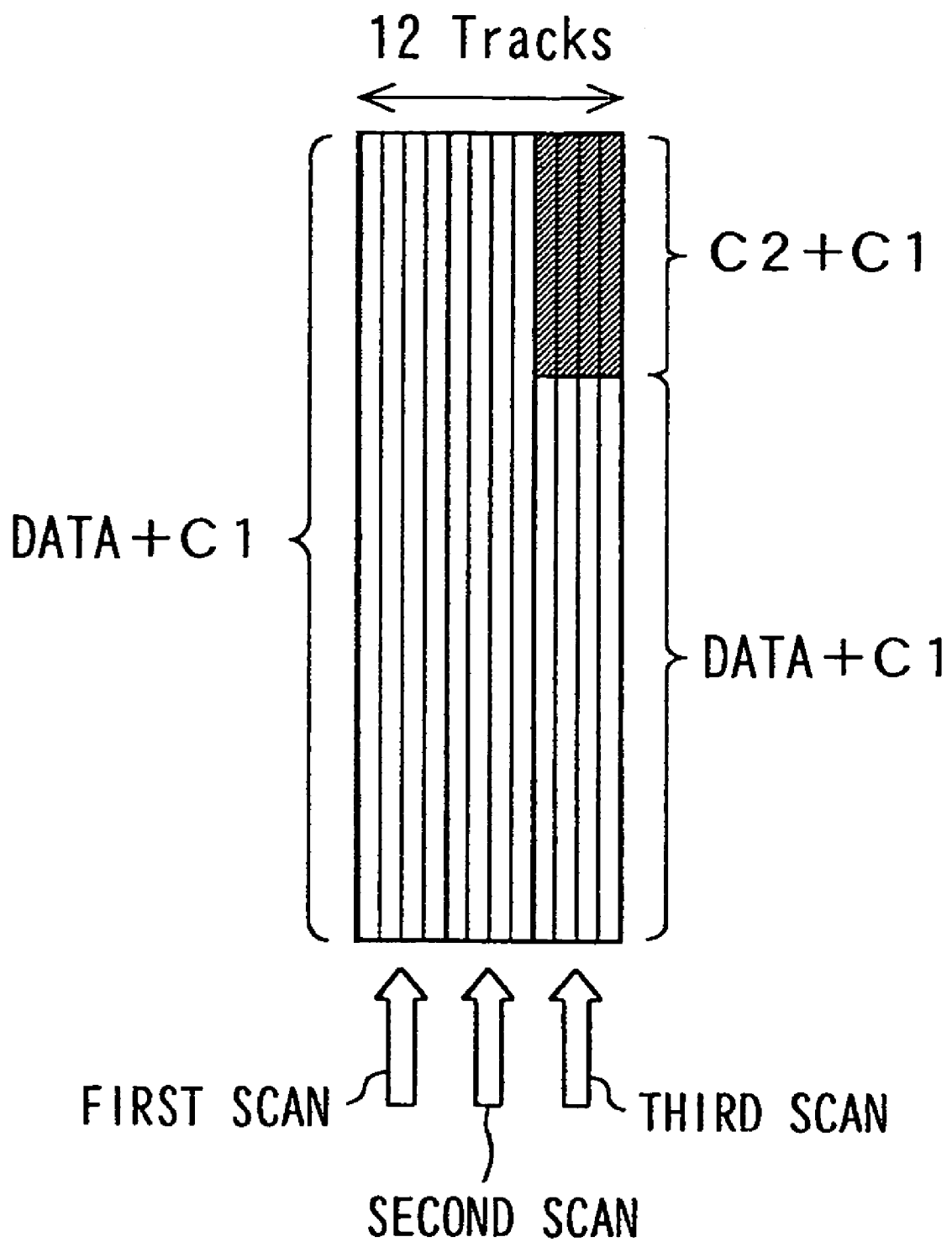
FIG. 10 is a view for showing an allocation example (2) of one sync-block of each ECC block in video data regions $ARV_L$ and $ARV_U$ in 12 tracks consisting of one segment.

FIG. 10 shows an allocation example (2) of one sync-block of each ECC block in video data regions $ARV_L$ and $ARV_U$ of 12 tracks consisting of one segment.

In this embodiment, when 36 ECC blocks, 0 to 35, are recorded in 12 tracks, as shown in FIG. 10, first sync-blocks are first sequentially recorded with a C1 parity being added to a data string of video data configuring an internal code computation data series. After recording of the first sync-blocks has terminated, second sync-blocks are sequentially recorded with a C1 parity being added to a data string of a C2 parity configuring an internal code computation data series.

Now, operations of the VTR during recording will be described with respect to an information-recording method according to the present invention.

The present embodiment presumes a case in which digital information is recorded in a magnetic tape 80 in accordance with a recording format in which two types of sync lengths exist. In addition, the magnetic tape 80 records video data Dv having a first sync length M and audio data Da having a second sync length N that is shorter than the first sync length M. In addition, the present embodiment presumes a case in which a CTL signal serving as a reference during reproduction of the digital information is recorded between a recording portion of the video sync (M) and a recording portion of the audio sync (N).

On the presumption of these matters, in the VTR 100 shown in FIG. 3, the video-compressing circuit 11 receives a recording video signal VSin from a video camera or the like via a video input terminal 110. The video-compressing circuit 11 compresses the recording video signal VSin. For example, the video-compressing circuit 11 divides the recording video signal VSin into two-dimensional blocks having 8×8 pixels, and carries out data compression using block encoding such as DCT. A recording audio signal ASin from a video camera or the like is output to a parity-adding circuit 21 via the audio input terminal 130. The parity-adding circuit 21 receives the video data (compression and encoding data) Dv thus compressed and the recording audio signal ASin. Then, the parity-adding circuit 21 performs error correction and encoding processing using a product code on the compression and encoding data Dv and error correction and encoding processing using a product code on the recording audio signal ASin.

The compression and encoding data Dv or the like after error correction and encoding is output from the parity-adding circuit 21 to the recorder 4. The recorder 4 records video data having a first sync length M and audio data having a second sync length N that is shorter than the first sync length M in a magnetic tape 80. This recorder 4 records a CTL signal serving as a reference during reproduction of the digital information between a recording portion of the video sync (M) and a recording portion of the audio sync (N).

For example, the recording circuit 40 receives and amplifies video data (error correction and encoding data) VDb from the parity-adding circuit 21. The recording circuit 40 outputs the error correction and encoding data VDb thus amplified to the helical recording head 50. The helical recording head 50 sequentially records the error correction and encoding data VDb in a recording track of the magnetic tape 80.

In addition, the CTL generator 60 generates a CTL signal serving as a reference during reproduction of error correction and encoding data VDb, modulates this CTL signal, and outputs the modulated signal to a CTL recording head 70. The CTL recording head 70 records in the magnetic tape 80 the CTL signal thus modulated output from the CTL generator 60. At this time, a servo pilot is recorded so that the CTL signal is positioned between the video sync (M) and the audio sync (N).

In this manner, with the VTR and information-recording method according to one embodiment of the present invention, in a case where digital information is recorded in accordance with a recording format in which two types of sync lengths exist, the pilot signal is allocated between a portion (M) at which a sync length is long and a portion (N) at which a sync length is short.

Therefore, when C1 correction processing during reproduction of digital information is carried out, a gap portion between a recording portion of the video sync (M) and a recording portion of the audio sync (N), and a recording portion of a CTL signal are effectively utilized as a signal-processing space.

[Information-Reproducing Apparatus]

Figure 11:
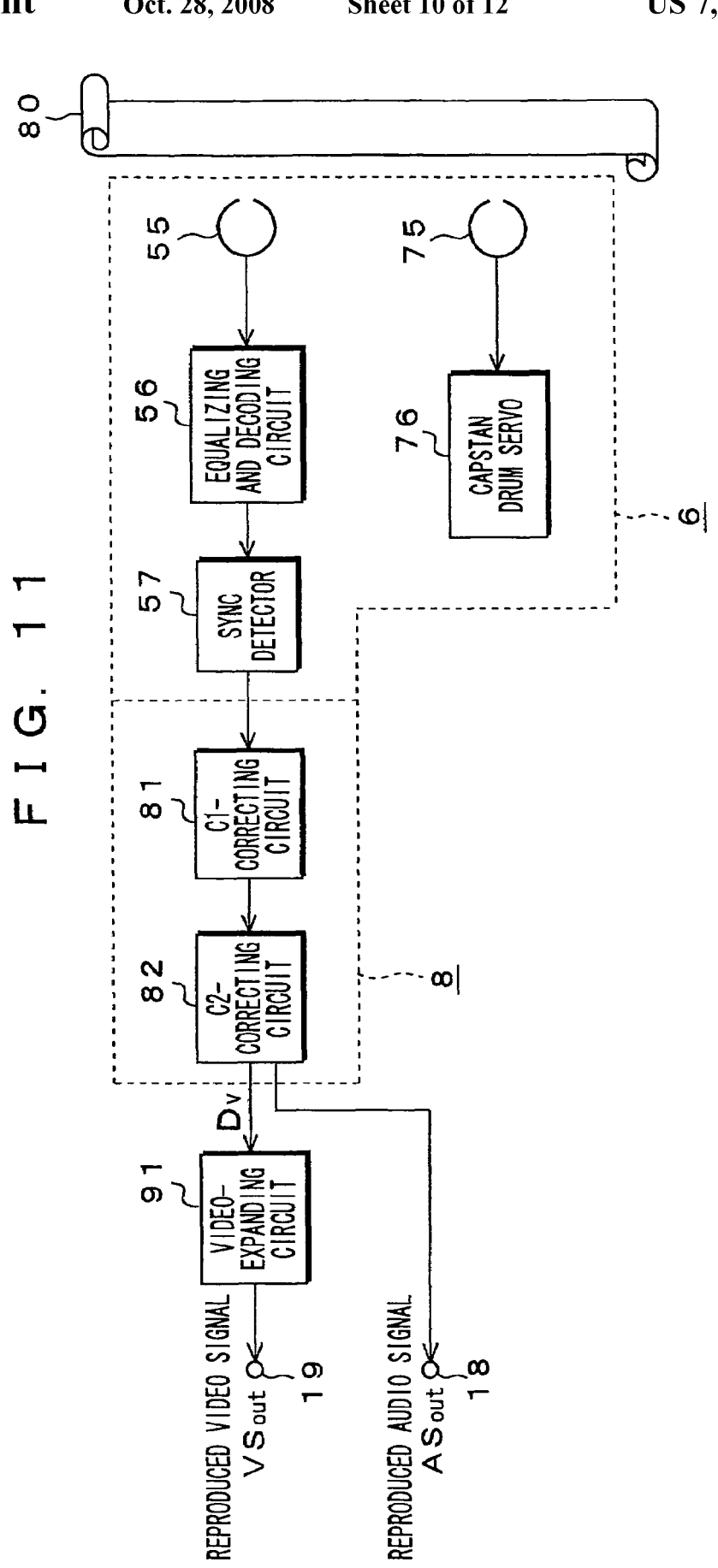
FIG. 11 is a block diagram for depicting a configuration of a reproducing system of VTR 100 obtained by applying an information-reproducing apparatus according to the present invention.

FIG. 11 is a block diagram for depicting a configuration of a reproducing system of VTR 100 obtained by applying an information-reproducing apparatus according to the present invention.

In the present embodiment, when the digital information is reproduced from the magnetic tape 80 having a recording format in which two types of sync lengths exist, a CTL signal serving as a reference during reproduction of the digital information is reproduced from a position between a recording portion of the video sync (M) and a recording portion of the audio sync (N) so that a gap portion between the recording portion of the video sync (M) and the recording portion of the audio sync (N), and a recording portion of the CTL signal can be effectively utilized as a signal-processing space required at error correction processing such as C1 correction processing.

The VTR 100 shown in FIG. 3 is provided as an apparatus for reproducing digital information from a magnetic tape 80 having a recording format in which two types of sync lengths exist. The VTR 100 can be used in combination with the information-recording apparatus shown in FIG. 1. Of course, this VTR may be independently utilized as a unit for carrying out reproduction only.

This VTR 100 has a reproducer 6, correction processor 8, an audio output terminal 18, a video output terminal 19, and a video-expanding circuit 91. The reproducer 6 reads a CTL signal, video data Dv having a first sync length M, and audio data Da having a second sync length N that is shorter than the first sync length M out of the magnetic tape 80, and reproduces them. The CTL signal is provided as a signal serving as a reference during reproduction of video data plus audio data DVc, and is read out and reproduced from a position between a recording portion of the video sync (M) and a recording portion of the audio sync (N) of the magnetic tape 80.

For example, the reproducer 6 has a helical reproducing head 55, an equalizing and decoding circuit 56, a sync detector 57, a CTL reproducing head 75, and a capstan drum servo 76. The helical reproducing head 55 reads video data+audio data VDc out of a recording track of the magnetic tape 80, and reproduces the data.

The equalizing and decoding circuit 56 is connected to the helical reproducing head 55. The equalizing and decoding circuit 56 is composed of a reproducing amplifier, a waveform-equalizing circuit, and a decoding circuit, not shown. In the reproducer 6, first, the video data+audio data VDc read out of a recording track is amplified by means of the reproducing amplifier. Then, the waveform-equalizing circuit waveform-equalizes the video data+audio data VDc. Further, in the decoding circuit, decoding processing using a Viterbi algorithm, for example, is carried out with respect to a reproduced signal after waveform equalization. Thus, the video data VDc is acquired, which correspond to recording video data VDb output from the parity-adding circuit 21 of a recording system shown in FIG. 1. A sync detector 57 is connected to the equalizing and decoding circuit 56, and detects a sync signal from the reproduced video data+audio data VDc.

In addition, the CTL reproducing head 75 reproduces a CTL signal from a servo pilot of a recording track of the magnetic tape 80. The CTL signal is read from a position between a recording portion of a video sync (M) of the magnetic tape 80 and a recording portion of the audio sync (N) and is then reproduced. A capstan drum servo 76 is connected to an output stage of the CTL reproducing head 75, and is provided so as to drive a capstan drum based on the CTL signal. The CTL signal serves as a reference when reproducing video data VDc is read out and reproduced from the magnetic tape 80.

Correction processor 8 is connected to the above-described sync detector 57, and sequentially executes error correction processing on the video data+audio data VDc after sync signal detection. The correction processor 8 comprises C1-correcting circuit 81 and C2-correcting circuit 82. In the C1-correcting circuit 81, for example, an ECC decoder is used. The C1-correcting circuit 81 performs C1 correction processing the reproduced video data+audio data VDc output from the sync detector 57. This C1-correcting circuit 81 carries out C1 correction processing using a parity (C1 parity) added to the reproduced video data+audio data VDc.

A C2-corrector circuit 82 is connected to this C1-correcting circuit 81, and, for example, an ECC decoder is used. The C2-correcting circuit 82 performs C2 correction processing on the reproduced video data+audio data VDc output from the C1-correcting circuit 81. This C2-correcting circuit 82 performs C2 correction processing using a parity (C2 parity) added to the reproduced video data+audio data VDc. Compression and encoding data after C2 correction is provided as video data Dv and reproduced audio signal ASout. The reproduced audio signal ASout output from this C2-correcting circuit 82 is output to the output terminal 18.

A video-expanding circuit 91 is connected to the C2-correcting circuit 82, and carries out data expansion for the video data (compression and encoding data) Dv after C2 correction, which is output from the C2-correcting circuit 82, in accordance with procedures reversed from those of the video-compressing circuit 11 of the recording system shown in FIG. 3. Then, the reproduced video signal VSout output from this video-expanding circuit 91 is output to an output terminal 19.

FIG. 12 is a block diagram for depicting an internal configuration of the C2-correcting circuit 82. The C2-correcting circuit 82 shown in FIG. 12 has an SDRAM 41 and an SDRAM interface 42 serving as an interface for carrying out writing and reading the data into and from this SDRAM 41. The SDRAM 41 has a capacity capable of storing the video data+audio data on a plurality of fields. In this case, in the SDRAM 41, memory spaces corresponding to 36 ECC blocks (refer to FIG. 8) are provided with respect to each field.

An input write buffer 43 is connected to this SDRAM interface 42, and is used as a buffer for writing into the SDRAM 41 the reproduced video data (compression and encoding data)+audio data VDc supplied from the C1-correcting circuit 81 shown in FIG. 11. A video C2 readout buffer 44 is connected to the SDRAM interface 42, and is used as a buffer for supplying to a video C2 corrector 45, described later, the reproduced video data Dv corresponding to 36 ECC blocks, which is read out of the SDRAM 41.

The C2 corrector 45 is connected to this C2 readout buffer 44, and is provided so as to compute C2 parities (external code parities) in 36 ECC blocks with respect to each field. The C2 corrector 45 has 36 computers for computing C2 parities, and is provided so as to compute C2 parities in the above-described 36 ECC blocks in parallel to each other. Thus, items of the video data corresponding to 36 ECC blocks are supplied in parallel to each other from the C2 readout buffer 44 to the C2 corrector 45. In this case, the video data on each ECC block is supplied in order of sync-block data from 0 to 113.

In addition, a C2 write buffer 46 is connected to the C2 corrector 45, and is used as a buffer for writing into the SDRAM 41 the C2 parities in 36 ECC blocks, which are computed by the C2 corrector 45 with respect to each field. Further, a video output buffer 410 is connected to the DRAM interface 42, and is used as a buffer for outputting the video data and C2 parities corresponding to 36 ECC blocks, which are read out of the SDRAM 41 with respect to each field. The video data (video output from C2-correcting circuit) Dv after C2 correction is output to the video-expanding circuit 91.

An audio C2 readout buffer 47 is connected to the SDRAM interface 42, and is used as a buffer for outputting audio data Da and C2 parities corresponding to 24 ECC blocks. The audio data Da and C2 parities are read out of the SDRAM 41 with respect to each field.

In addition, an audio C2 readout buffer 48 is connected to the audio C2 corrector 48, and is provided so as to computer C2 parities (external code parities) in 24 ECC blocks with respect to each field. An audio output buffer 49 is connected to the C2 corrector 48, and is used as a buffer for outputting audio data Da and C2 parities corresponding to 24 ECC blocks with respect to each field. An audio output from C2-correcting circuit 82, after C2 correction, is provided as the reproduced audio signal ASout, and is output to the output terminal 18.

Now, operations, during reproduction, of the VTR will be described with respect to an information-reproducing method according to the present invention.

The present embodiment presumes a case in which digital information is reproduced from the magnetic tape 80 having a recording format in which two types of sync lengths exist. From the magnetic tape 80, video data having a first sync length and audio data having a second sync length that is shorter than the first sync length are reproduced. In addition, a CTL signal serving as a reference during reproduction of the digital information is reproduced from a position between a recording portion of the video sync (M) and a recording portion of the audio sync (N).

FIGS. 13A and 13B are time charts for comparing signal-processing spaces provided by a servo pilot between the video sync (M) and the audio sync (N) with respect to a conventional system and the system according to the present invention. Reference is made to an example of a VTR format shown in FIG. 7.

In the time chart shown in FIG. 13A, a gap between a video sync (M) and an audio sync (N) is defined as Gva; a gap between audio syncs (N) is defined as Gaa; a scanning width (allocation length) of a servo pilot signal is defined as SAT; a gap between the video sync (M) and a servo pilot signal is defined as Gs1; and a gap between this servo pilot signal and the audio sync (N) is defined as Gs2. Thus, a total gap G between upper and lower video syncs (M) according to the conventional system is expressed as formula (1):

$$G = Gva + Gaa*6 + Gs1 + Gs2 + Gav \quad (1)$$

In formula (1), assuming that an L (line) gap is Lgap, a gap Gva is defined as follows.

$$Gva > 2*(M-N) + 2*(P1-P2) + Lgap$$

In addition, a delay according to a sync length is required for C1 correction processing. This delay can be expressed in a form such that a sync length and a length of a C1 parity thereof are multiplied by a coefficient. In actuality, this coefficient is different depending on the C1-correcting circuit, and in the examples shown in FIGS. 13A and 13B, both of the coefficients relevant to a sync length and a parity is set to 2. Here, assume that a delay according to C1 parity calculation in C1 correction processing is defined as P1; a delay according to C2 parity calculation in C2 correction processing is defined as P2; a sync length of video data is defined as M; and a sync length of audio data is defined as N. At this time, when a gap required for video tape editing is defined as Ge, formula (2) is established below.

$$Ge = Ge*10 + (M-N) + 2*(P1-P2) + 2 \quad (2)$$

In contrast, if a signal-processing space between a video sync (M) and an audio sync (N) that is required for carrying out C1 correction processing may be set to be shorter than a length of a servo pilot signal, a total gap G' between upper and lower video syncs (M) in a case of applying the system according to the present invention is obtained by formula (3) below.

$$G' = Gs1 + Gs2 + Gaa*7 + Gav = Ge*10 \quad (3)$$

In formula (3), a gap Gs1+SAT+Gs2 equivalent to the gap Gav can be expressed by the following inequality.

$$Gs1 + SAT + Gs2 > 2*(M-N) + 2*(P1-P2) + Lgap$$

Here, in comparing formulas (2) and (3) with each other, it is found that a gap Ge' required for tape editing according to the system of the present invention may be shorter compared with that of the conventional system.

On the presumption of the above fact, operations of the VTR 100 during reproduction will be described here.

First, a helical reproducing head 55 sequentially reads recorded video data having a first sync length+recorded audio data VDc having a second sync length from a recording track of the magnetic tape 80 based on a signal of a predetermined clock frequency. In addition, a servo control signal (CTL signal) is reproduced from a servo pilot of the recording track of the magnetic tape 80. A capstan drum is driven based on this CTL signal.

The video data+audio data VDc are sequentially output from the helical reproducing head 55 to the equalizing and decoding circuit 56 of the reproducer 6. In the equalizing and decoding circuit 56, video data+audio data (reproduced data) VDc (the video data having a first sync length and the audio data having a second sync length) are amplified by means of a reproducing amplifier (not shown). Then, the reproduced data VDc is waveformed by means of a waveform-equalizing circuit. Further, the decoding circuit performs decoding processing utilizing a Viterbi algorithm, for example, on a reproduced signal thus waveform-equalized, and reproduced data VDc corresponding to the recording video data VDb output from the parity-adding circuit 21 of the above-described recording system is acquired.

This reproduced data VDc is output from the equalizing and decoding circuit 56 to the sync detector 57. In the sync detector 57, synchronous signal is detected. The reproduced data VDc whose synchronous signal has been detected is output from the sync detector 57 to a C1-correcting circuit 81. The C1-correcting circuit 82 carries out error correction using a C1 parity added to the video data+audio data VDc of the frame.

At this time, if an audio sync (N) is longer than a signal-processing space between a video sync (M) and an audio sync (N), which is required for carrying out C1 correction processing, a gap G may be zero. In the system according to the present invention, a servo pilot is allocated between a recording portion of the video sync (M) and a recording portion of the audio sync (N), and a CTL signal serving as a reference during reproduction of the digital information is reproduced from this position. Thus, in comparison with the conventional system, in accordance with the above-described formulas (2) and (3), it is possible to avoid a circumstance that, error correction processing of the audio sync (N), which has shorter recording length, is started before error correction processing of the video sync (M) completes or the data processing is accidentally incorporated.

The C2 corrector circuit 82 carries out error correction using a C2 parity added to video data+audio data VDc of the frame. The compression and encoding data after error correction includes video data Dv and audio data Da, and the audio data Da is provided as are produced audio signal ASout. The reproduced audio signal ASout is output to an audio output terminal 18.

This video data Dv is output from the C2-correcting circuit 82 to the video-expanding circuit 91. The video-expanding circuit 91 carries out data expansion for video data (compression and encoding data) Dv after error correction, which is output from the C2-correcting circuit 82, in accordance with procedures reversed by those of the video-compressing circuit 11 of the recording system. Then, a reproduced video signal VSout output by this video-expanding circuit 91 is output to the output terminal 19.

In this manner, with the VTR 100 and information-reproducing method according to one embodiment of the present invention, in a case where the video sync (M) and the audio sync (N) are reproduced from the magnetic tape 80 in a VTR format in which two types of sync lengths exist, a CTL signal is reproduced from a servo pilot positioned between the video sync (M) and the audio sync (N) shown in FIG. 13B.

Therefore, when error correction processing such as C1 correction processing is carried out, a gap portion between a recording portion of the video sync (M) and a recording portion of the audio sync (N), and a recording portion of the CTL signal can be effectively utilized as a signal-processing space. This prevents error correction processing of the audio sync (N), which is shorter than the video sync length, from starting before error correction processing of the video sync (M) completes to cause circumstance that data processing is accidentally incorporated. As a result, a waveform can be increased to the maximum with respect to an effective track length limited in the magnetic tape 80.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. An information-recording apparatus for recording digital information in an information-recording medium in accordance with a recording format in which two types of information-recording lengths exist, said digital information including image information having a first information-recording length and audio information having a second information-recording length, said second information-recording length being shorter than said first information recording length, the information-recording apparatus comprising:
   a recorder for recording the image information and the audio information in said information-recording medium,
   wherein the recorder records a servo control signal between a recording portion of the image information having the first information-recording length and a recording portion of the audio information having the second information-recording length, said servo control signal serving as a reference during reproduction of said image information and said audio information, and
   wherein the recorder records the servo control signal after the image information having the first information-recording length and before the audio information having the second information-recording length.

2. An information-recording method for recording digital information in an information-recording medium in accordance with a recording format in which two types of information-recording lengths exist, said digital information including image information having a first information-recording length and audio information having a second information-recording length, said second information-recording length being shorter than said first information recording length, said method comprises the steps of:
   recording said image information and said audio information in said information-recording medium; and
   recording a servo control signal between a recording portion of the image information having the first information-recording length and a recording portion of the audio information having the second information-recording length, said servo control signal serving as a reference during reproduction of said image information and said audio information,
   wherein the servo control signal is recorded after the image information having the first information-recording length and before the audio information having the second information-recording length.

3. An information-reproducing apparatus for reproducing digital information from an information-recording medium having a recording format in which two types of information recording lengths exist, said digital information including image information having a first information-recording length and audio information having a second information-recording length, said second information-recording length being shorter than said first information recording length, said information-reproducing apparatus comprising:
   a reproducer for reproducing said image information and said audio information from said information-recording medium,
   wherein said reproducer reproduces a servo control signal between a recording portion of the image information having said first information-recording length and a recording portion of the audio information having said second information-recording length, said servo control signal serving as a reference during reproduction of said image information and said audio information, and
   wherein the reproducer reproduces the servo control signal after the image information having the first information-recording length and before the audio information having the second information-recording length.

4. The information-reproducing apparatus as claimed in claim 3, further comprising correction processor for sequentially correcting said image information having the first information-recording length and said audio information having the second information-recording length, said first and audio information being reproduced by said reproducer.

5. An information-reproducing method for reproducing digital information from an information-recording medium having a recording format in which two types of information recording lengths exist, said digital information including image information having a first information-recording length and audio information having a second information-recording length, said second information-recording length being shorter than said first information recording length, said method comprising the steps of:

reproducing said image information and said audio information from said information-recording medium; and reproducing a servo control signal between a recording portion of the image information having said first information-recording length and a recording portion of the audio information having the second information-recording length, said servo control signal serving as a reference during reproduction of said image information and said audio information, wherein the servo control signal is reproduced after the image information having the first information-recording length and before the audio information having the second information-recording length.

6. The information-reproducing method as claimed in claim 5, further comprising the step of correcting the reproduced image information having said first information-recording length and the reproduced audio information having said second information-recording length sequentially.

7. The information-recording apparatus as claimed in claim 1, wherein a gap portion between the recording portion of the image information having the first information-recording length and the recording portion of the audio information having the second information-recording length, and a recording portion of the servo control signal is utilized as a signal-processing space required for carrying out error correction processing during reproduction of said image information and said audio information.

8. The information-recording method as claimed in claim 2, wherein a gap portion between the recording portion of the image information having the first information-recording length and the recording portion of the audio information having the second information-recording length, and a recording portion of the servo control signal is utilized as a signal-processing space required for carrying out error correction processing during reproduction of said image information and said audio information.

9. The information-reproducing apparatus as claimed in claim 3, wherein said reproducer reproduces a gap portion between the recording portion of the image information having the first information-recording length and the recording portion of the audio information having the second information-recording length, and a recording portion of the servo control signal is utilized as a signal-processing space required for carrying out error correction processing during reproduction of said image information and said audio information.

10. The information-reproducing apparatus as claimed in claim 9, further comprising correction processor for sequentially correcting said image information having the first information-recording length and said audio information having the second information-recording length, said first and audio information being reproduced by said reproducer.

11. The information-reproducing method as claimed in claim 5, wherein a gap portion between the recording portion of the image information having the first information-recording length and the recording portion of the audio information having the second information-recording length, and a recording portion of the servo control signal is utilized as a signal-processing space required for carrying out error correction processing during reproduction of said image information and said audio information.

12. The information-reproducing method as claimed in claim 11, further comprising the step of correcting the reproduced image information having said first information-recording length and the reproduced audio information having said second information-recording length sequentially.

* * * * *